US008904159B2

(12) United States Patent
Bealkowski

(10) Patent No.: US 8,904,159 B2
(45) Date of Patent: Dec. 2, 2014

(54) METHODS AND SYSTEMS FOR ENABLING CONTROL TO A HYPERVISOR IN A CLOUD COMPUTING ENVIRONMENT

(75) Inventor: Richard Bealkowski, Redmond, WA (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 12/861,780

(22) Filed: Aug. 23, 2010

(65) Prior Publication Data

US 2012/0047357 A1 Feb. 23, 2012

(51) Int. Cl.
*G06F 15/177* (2006.01)
*G06F 9/00* (2006.01)
*G06F 9/455* (2006.01)
*G06F 9/46* (2006.01)
*G06F 9/50* (2006.01)

(52) U.S. Cl.
CPC .................................. *G06F 9/5072* (2013.01)
USPC .................. 713/2; 718/1; 718/100; 709/201; 709/203; 709/222; 709/226

(58) Field of Classification Search
CPC . G06F 9/4416; G06F 9/4445; G06F 9/45533; G06F 9/45545; G06F 9/45554; G06F 9/45558; G06F 9/5061; G06F 9/5077; G06F 15/177
USPC .............. 718/1, 100; 790/201, 203, 222, 226; 713/2
See application file for complete search history.

(56) References Cited

U.S. PATENT DOCUMENTS

| 7,962,647 | B2 * | 6/2011 | Suri et al. ...................... 709/238 |
| 2003/0041088 | A1 * | 2/2003 | Wilson et al. ................. 709/104 |
| 2005/0044228 | A1 * | 2/2005 | Birkestrand et al. .......... 709/226 |
| 2009/0172661 | A1 | 7/2009 | Zimmer et al. |
| 2009/0282284 | A1 | 11/2009 | Naohiro et al. |
| 2010/0088500 | A1 | 4/2010 | Ball et al. |
| 2010/0169477 | A1 * | 7/2010 | Stienhans et al. ............. 709/224 |
| 2010/0211579 | A1 * | 8/2010 | Fujioka ......................... 707/754 |
| 2011/0185063 | A1 * | 7/2011 | Head et al. ..................... 709/226 |
| 2012/0047357 | A1 * | 2/2012 | Bealkowski ...................... 713/2 |

FOREIGN PATENT DOCUMENTS

| KR | 20080079549 A | 1/2008 |
| WO | 2009120272 A1 | 10/2009 |

OTHER PUBLICATIONS

Int'l. Search Report for corresponding PCT Application No. PCT/EP2011/083540 mailed Nov. 4, 2011.
Cunsolo, Vincenzo D. et al., Volunteer Computing and Desktop Cloud: the Cloud@Home Paradigm, 2009 Eighth IEEE International Symposium on Network Computing and Applications, 2009, pp. 134-139, IEEE.
Rochwerger B. et al., The Reservoir Model and Architecture for Open Federated Cloud Computing, IBM Journal of Research and Development, Apr. 6, 2009, X:1-X:11, vol. 53, No. 4, Allen Press, Inc.

* cited by examiner

Primary Examiner — Tanh Nguyen
(74) Attorney, Agent, or Firm — Olive Law Group, PLLC; Thomas E. Tyson

(57) ABSTRACT

A method for enabling control in a cloud computing environment includes initializing a portion of computing resources identified for enabling service to a user system in a cloud computing environment. The method may also include enabling service to the user system. Further, the method may include initializing another portion of the computing resources. After the service in the cloud computing environment has been enabled, cloud computing services may be provided by the host system to one or more user systems.

20 Claims, 5 Drawing Sheets

METHODS AND SYSTEMS FOR ENABLING CONTROL TO A HYPERVISOR IN A CLOUD COMPUTING ENVIRONMENT

BACKGROUND

1. Field of the Invention

The present invention relates to cloud computing, and more specifically, to methods and systems for enabling control to a hypervisor in a cloud computing environment.

2. Description of Related Art

Cloud computing is Internet-based computing, whereby shared resources, software, and information are provided to computers and other devices on-demand, like the electricity grid. Cloud computing describes a new supplement, consumption, and delivery model for Information Technology (IT) services based on the Internet, and it typically involves over-the-Internet provision of dynamically scalable and often virtualized resources to user systems as a service over the Internet. Most cloud computing infrastructure consists of reliable services delivered through data centers and built on servers.

A hypervisor, also referred to as a Virtual Machine Monitor (VMM), allows multiple operating systems to run concurrently on a host system, such as a host computer or server providing cloud computing services to host systems. Such a feature is often referred to as hardware virtualization. The hypervisor may present guest operating systems with a virtual platform and may monitor the execution of the guest operating systems. In this way, multiple operating systems, including multiple instances of the same operating system, can share hardware resources in the cloud computing environment.

Hypervisors are generally classified as being either Type 1 or Type 2. A Type 1 hypervisor (or native, bare metal hypervisor) runs directly on the host's hardware for controlling the hardware and for monitoring guest operating systems. A guest operating system thus runs on another level above the hypervisor. A Type 2 hypervisor (or hosted hypervisor) runs within a conventional operating system environment, with the hypervisor layer as a distinct second software level, and the guest operating systems running at another level above the hardware.

Servers can be over-featured for the fundamental needs of a cloud computing service provider. For example, current cloud computing servers include a firmware abstraction layer such as a basic input/output system (BIOS) layer, a unified extensible firmware interface (UEFI) layer, or an Open Firmware layer. The support of these layers and other firmware can be costly to a server vendor in terms of time and expense.

Accordingly, for at least the aforementioned reasons, there is a desire to reduce the complexity of host systems providing services to user systems in a cloud computing environment.

BRIEF SUMMARY

One or more embodiments of the present invention provide a method for enabling control in a cloud computing environment. For example, the method may be used to enable control to be efficiently provided to a hypervisor of a host system. The method includes initializing a portion of computing resources identified for enabling service to a user system in a cloud computing environment. The method may also include enabling service to the user system. Further, the method may include initializing another portion of the computing resources. After the service in the cloud computing environment has been enabled, cloud computing services may be provided by the host system to one or more user systems.

One or more embodiments of the present invention provide a method including initializing a processor and memory in a host system. The method also includes enabling a Type 1 hypervisor residing on the host system and configured to provide cloud computing service to a user system in a cloud computing environment. The hypervisor may be enabled directly after the processor and memory are initialized. After the hypervisor is enabled, various other computing resources may be initialized, such as, but not limited to, portions of the memory that have not been previously initialized, and an input/output bus module. In addition, after the hypervisor is enabled, the hypervisor may provide service to one or more user systems, such as, but not limited to, providing a guest operating system and a virtual machine for use by the user systems.

DETAILED DESCRIPTION

Exemplary methods and systems for enabling a hypervisor to assume control in a cloud computing environment in accordance with embodiments of the present invention are described herein. Particularly, described herein are exemplary methods and systems for enabling a hypervisor to efficiently assume control of a host system implementing a cloud computing environment in response to host system boot or power up. In an example, the hypervisor may be provided with efficient control of the host system by only initializing a portion of computing resources made available by the host system and that are identified for enabling service to a user system in a cloud computing environment. The identified computing resources may be the only resources needed to enable access to the cloud computing environment. Subsequent or simultaneous to enabling cloud computing service to the user system, another portion of the computing resources may be initialized. In this way, the identified computing resources may be given priority before other resources are initialized. By giving initialization priority to the identified computing resources, the host system may enable user systems to quickly and efficiently access services provided by the cloud computing environment.

In accordance with one or more embodiments of the present invention, a firmware abstraction layer such as a BIOS layer, UEFI layer, and/or an Open Firmware layer may not be included in a host system. These layers may not be needed in systems and methods according to embodiments of the present invention, because in the presently disclosed systems the hypervisor may assume control after completion of platform initialization. By not including the firmware abstraction layer, the time and costs associated with developing and maintaining such layers may be eliminated.

Figure 1:
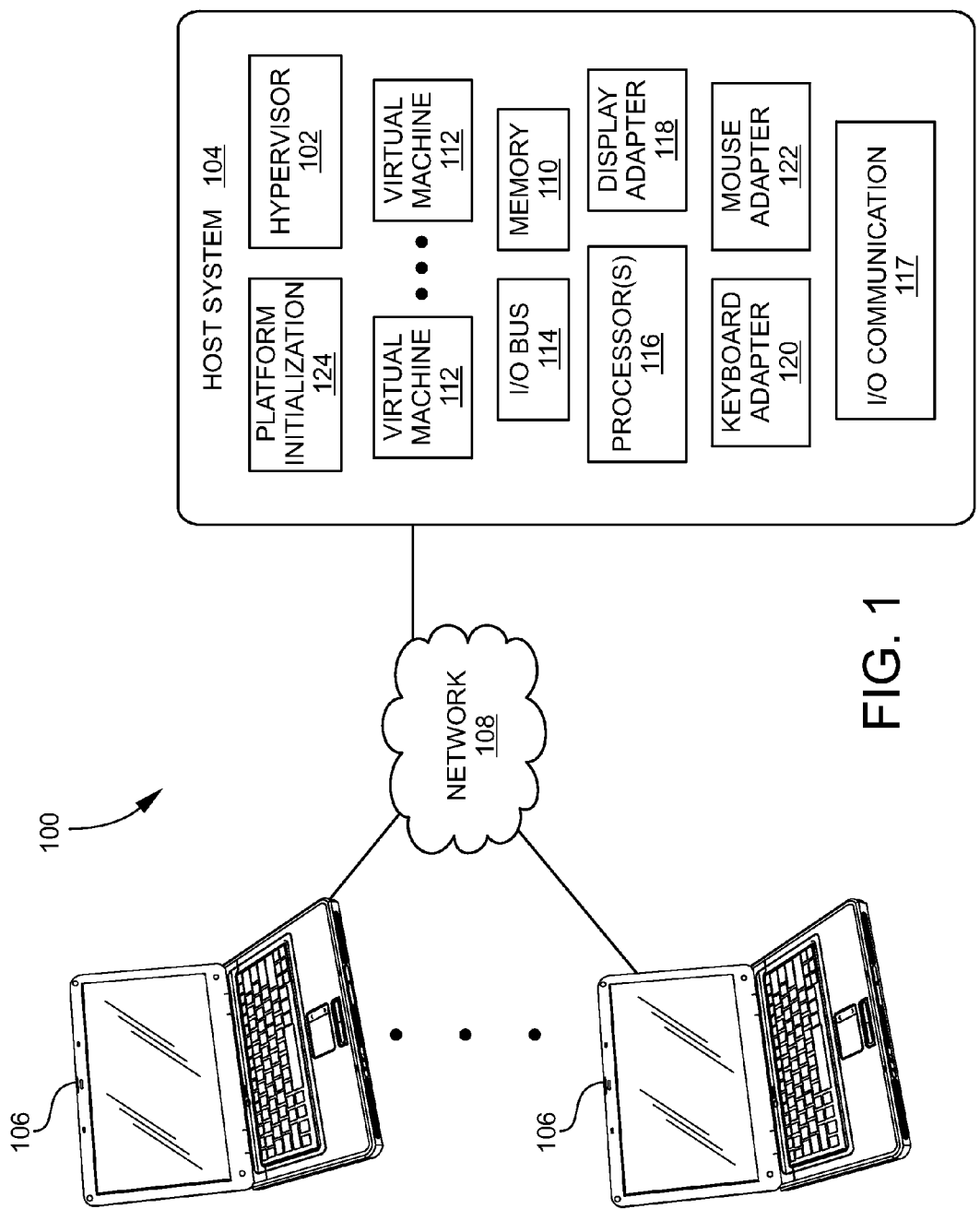
FIG. 1 sets forth a block diagram of a system for enabling a hypervisor to efficiently assume control in a cloud computing environment in accordance with embodiments of the present invention.

FIG. 1 illustrates a block diagram of a system 100 for enabling a hypervisor 102 to efficiently assume control in a cloud computing environment in accordance with embodiments of the present invention. Referring to FIG. 1, the system 100 may include a host system 104 implementing a cloud computing environment for one or more user systems 106. The host system 104 may be in communication with the user systems 106 over a network 108. In one or more embodiments of the present invention, the host system 104 includes one or more servers each having one or more processors (e.g., a CPU) capable of reading and executing instructions, and handling requests from user systems 106 in a cloud computing environment. The host system 104 may run various applications, and may serve as an applications server, Web server, and/or a database server. The user systems 106 may be a desktop computer, a laptop computer, a general-purpose computer, a smartphone, or any other suitable computing device having an interface for communicating with the host system 104. Users can initiate various tasks on the host system 104 via the user systems 106, such as running application programs. While only a single host system 104 is shown in FIG. 1, it will be understood that multiple host systems can be implemented, each in communication with one another via direct coupling or via one or more networks. For example, multiple host systems may be interconnected through a distributed network architecture. The single host system 104 may also represent a cluster of hosts collectively performing processes as described in greater detail herein.

The network 108 may be any suitable type of communications network known to those of skill in the art. For example, the network 108 may be an intranet, extranet, or an internetwork, such as the Internet, or a combination thereof. The network 108 may include wireless, wired, and/or fiber optic links.

The host system 104 may access and store data in memory 110. The memory 110 may be any suitable type of storage and may include a secondary storage element, e.g., hard disk drive, tape, or a storage subsystem that is internal or external to the host system 104. Types of data that may be stored in the memory 110 include, for example, log files and databases. It should be understood that the memory 110 is provided for purposes of simplification and ease of explanation and is not to be construed as limiting in scope. The memory 110 may be in the form of multiple memory devices utilized by the host system 104.

The host system 104 may execute various applications, including the hypervisor 102 and multiple virtual machines 112. The hypervisor 102 may manage access to computing resources of the host system 104 and may serve as a virtual machine monitor (VMM) to support concurrent operation of the multiple virtual machines 112 on the host system 104. Each virtual machine 112 can support specific guest operating systems and multiple user sessions for executing software written to target the guest operating systems. For example, one virtual machine 112 may support an instance of a particular operating system, while another virtual machine 112 executes an instance of another operating system. Any suitable type of operating system known by those of skill in the art can be supported by the hypervisor 102 through the virtual machines 112.

The computing resources of the host system 104 may include any suitable hardware, software, and/or firmware needed for enabling cloud computing service to be provided to the user systems 106. Some or all of these computing resources may be necessary for operation of the host system 104 (e.g., booting or powering up of the host system) and for enabling service to the user systems 106 in the cloud computing environment. Exemplary computing resources include, but are not limited to, the memory 110, one or more input/output (I/O) bus modules 114, one or more processors 116, one or more I/O communication modules 117, a display adapter 118, a keyboard adapter 120, a mouse adapter 122, and the like. These computing resources and others residing on the host system 104, or accessible for use by the host system 104, may be used by the hypervisor 102 for enabling a user system 106 to operate an assigned virtual machine 112.

The I/O communication modules 117 may be configured for sending communications to and receiving communications from the network 108. For example, the I/O communication modules 117 may manage communication of messages between user systems 106 and the host system 104. Such messages may include, for example, information relating to cloud computing services provided by the host system 104 to the user systems 106 as will be understood by those of skill in the art.

In accordance with embodiments of the present invention, the host system 104 may include a platform initialization module 124. The platform initialization module 124 may be implemented by hardware, software, firmware, or combinations thereof for initializing the host system 104 to provide cloud computing services to one or more of the user systems 106. The platform initialization module 124 may be used for initializing computing resources of the host system 104 during boot up or power up in accordance with embodiments of the present invention.

A portion of the computing resources may be identified, apart from other computing resources, as having priority for initialization in response to boot or power up of the host system 104. This portion of the computing resources may be necessary for enabling service to user systems in the cloud computing environment. In response to boot up or power up of the host system 104, the platform initialization module 124 may initialize one or more of the identified computing resources for efficiently enabling service to user systems. The identified computing resources may be initialized in a predetermined order. The identified computing resources may include, but are not limited to, all or a portion of the memory 112, the I/O bus module 114, the processor 116, the display adapter 118, the keyboard adapter 120, the mouse adapter 122, various other computing resources, and the like. Other computing resources, such as, but not limited to, another portion of the memory 112, may be initialized subsequent or simultaneous with the enablement of services to the user systems 106.

Figure 2:
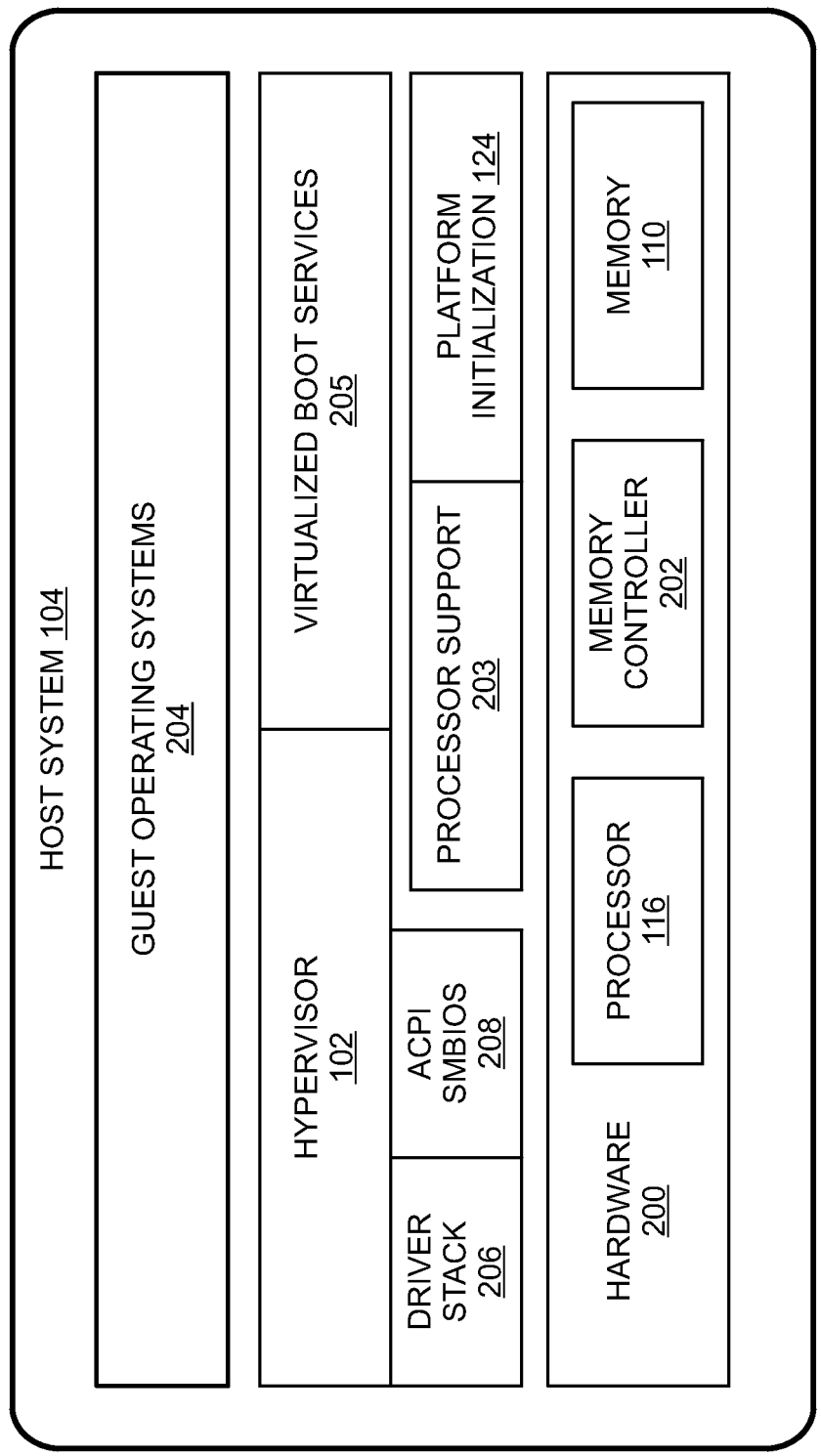
FIG. 2 sets forth a block diagram of a host system in accordance with one or more embodiments of the present invention.

FIG. 2 illustrates a block diagram of the host system 104 in accordance with one or more embodiments of the present invention. In this exemplary block diagram, reference is made to the host system 104 shown in FIG. 1 for purposes of illustration; however, reference to the example of FIG. 1 should not be construed as limiting. As depicted in FIG. 2, the host system 104 may include a plurality of layers and functions for providing use of the virtual machines 112 to the user systems 106 in the clouding computing environment. The host system 104 may include a hardware layer 200 having the processor (e.g., a CPU) 116, a memory controller 202, and the memory 110. The processor 116 may interact with the memory controller 202, which may control the writing and reading of data to and from the memory 110. The memory 110 may include multiple memory modules, each of which may include multiple storage devices, such as, but not limited to, random access memory (RAM) chips. The hardware layer 200 may also contain other suitable hardware, such as, but not limited to, communication channels, I/O ports, a clock, bus systems, and controllers. The processor 116 may be supported by a processor support module 203, which resides above the hardware layer 200.

The hypervisor 102 resides above the hardware layer 200 and supports the execution of virtual machines. For example, the hypervisor 102 may support the execution of guest operating systems 204 of the virtual machines. A virtualized boot services module 205 may provide booting functions and support for the guest operating systems 204. Further, the hypervisor 102 may be responsible for both sharing of hardware resources and the enforcement of control rules based on the available hardware resources. In this example, the hypervisor 102 is a Type 1 hypervisor, and thus runs in supervisor mode or privileged mode on "bare metal".

The host system 104 may include a driver stack 206 managed by the hypervisor 102 for controlling the operation of hardware resources. Further, the host system 104 may include platform firmware tables such as, but not limited to, advance configuration and power interface (ACPI) tables and system management basic input/output system (SMBIOS) tables 208.

As mentioned above, exemplary methods for enabling a hypervisor to assume control in a cloud computing environment in accordance with embodiments of the present invention are described with reference to the accompanying drawings. By use of these exemplary methods and systems, the host system may enable user systems to quickly and efficiently access services provided by the cloud computing environment subsequent to boot up or start up of a host system. For further explanation, FIG. 3 sets forth a flowchart illustrating an exemplary method of enabling a hypervisor to assume control in a cloud computing environment according to embodiments of the present invention. In this exemplary method, reference is made to the host system 104 shown in FIGS. 1 and 2 for purposes of illustration; however, reference to the host system 104 should not be construed as limiting.

Figure 3:
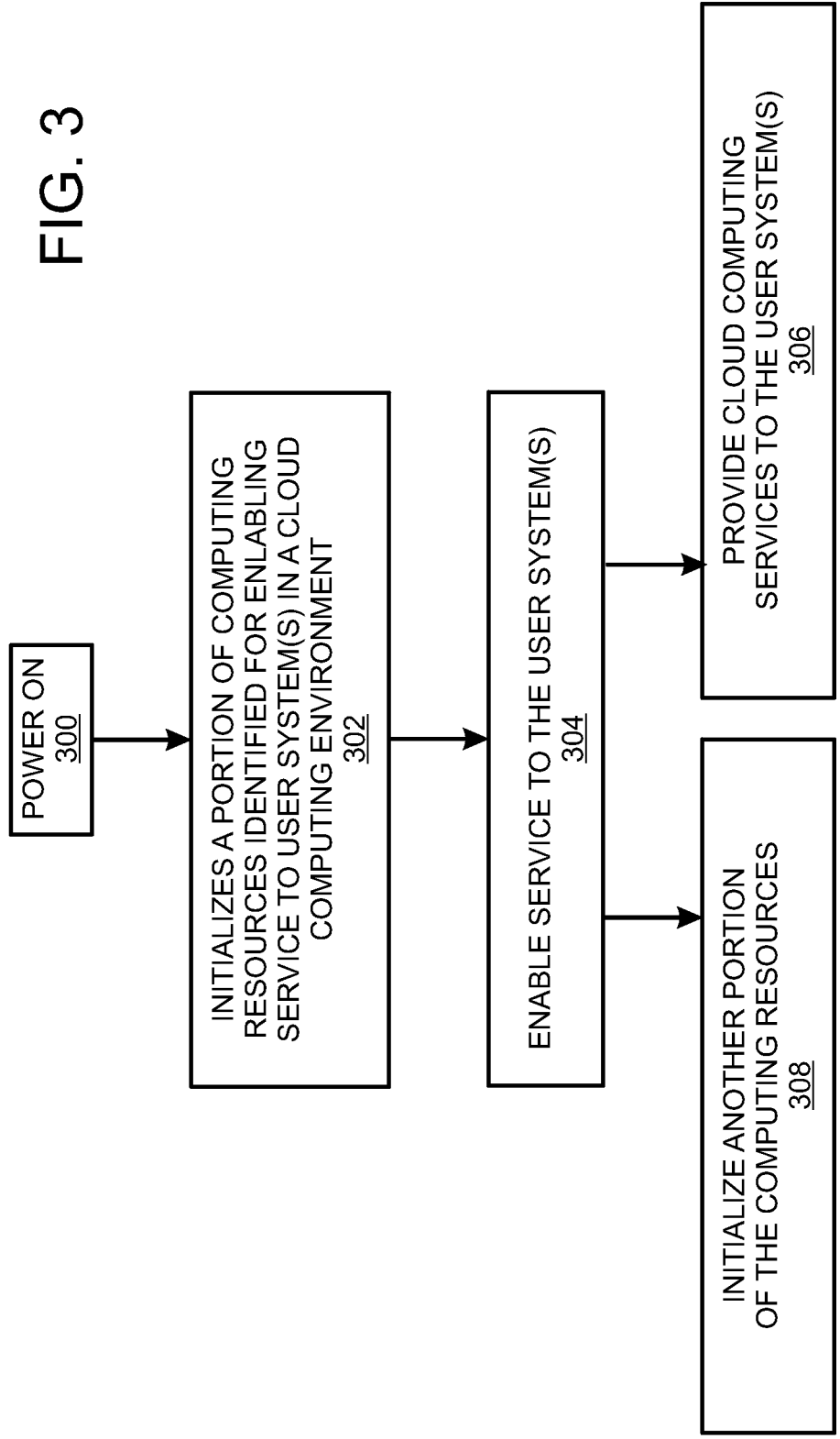
FIG. 3 sets forth a flowchart of an exemplary method of enabling a hypervisor to assume control in a cloud computing environment according to embodiments of the present invention.

Referring to FIG. 3, the method includes powering on or booting 300 a host system. For example, the host system 104 shown in FIGS. 1 and 2 may be powered on for providing cloud computing service. In response to the host system powering on or booting, a portion of computing resources identified for enabling service to one or more user systems in a cloud computing environment may be initialized 302. This portion of the computing resources may be a portion that is identified in a data structure as being needed for enabling the hypervisor 102 to assume control in the computing environment. The platform initialization module 124 may initialize the portion of computing resource identified in the data structure.

Memory, hardware resources, a processor, an input/output (I/O) bus module, a display adapter, a keyboard adapter, a mouse adapter, combinations thereof, and portions thereof may be identified or specified in a memory (e.g., non-volatile memory store, such as flash memory) as being needed for enabling the hypervisor 102 to assume control in the computing environment. For example, a predetermined size of memory 110 may be identified as being needed for enabling the hypervisor 102 to assume control in the computing environment. The hypervisor may be configured to provide an environment to the user system for running applications in the cloud computing environment. Further, the hypervisor may include a kernel, a memory management function, a driver, combinations thereof, or any suitable hardware, software, and/or firmware for providing the environment. The platform initialization module 124 may access the data structure for discovering the resources that have been identified. In an example, these identified resources may be provided with high initialization priority such that cloud computing resources can be quickly and efficiently provided to user systems after power on or boot up.

The method of FIG. 3 includes enabling 304 services to one or more user systems. For example, after the identified resources have been initialized, the hypervisor 102 may be enabled to provide virtual machines 112 for use by the user systems 106. The host system 104 may then provide 306 cloud computing services to one or more of the user systems. For example, the host system 104 can load and execute the virtual machines 112.

The method of FIG. 3 includes initializing 308 another portion of the computing resources. This other portion of the computing resources may be initialized either subsequent or simultaneous to enabling service to the user systems. For example, other portions of memory, hardware resources, software resources, firmware resources, and combinations thereof may be initialized while cloud computing services are provided to the user systems. The host system 104 may operate in a degraded or partially limited mode until all or other portions of the computing resources of the host system 104 are available.

Figure 4:
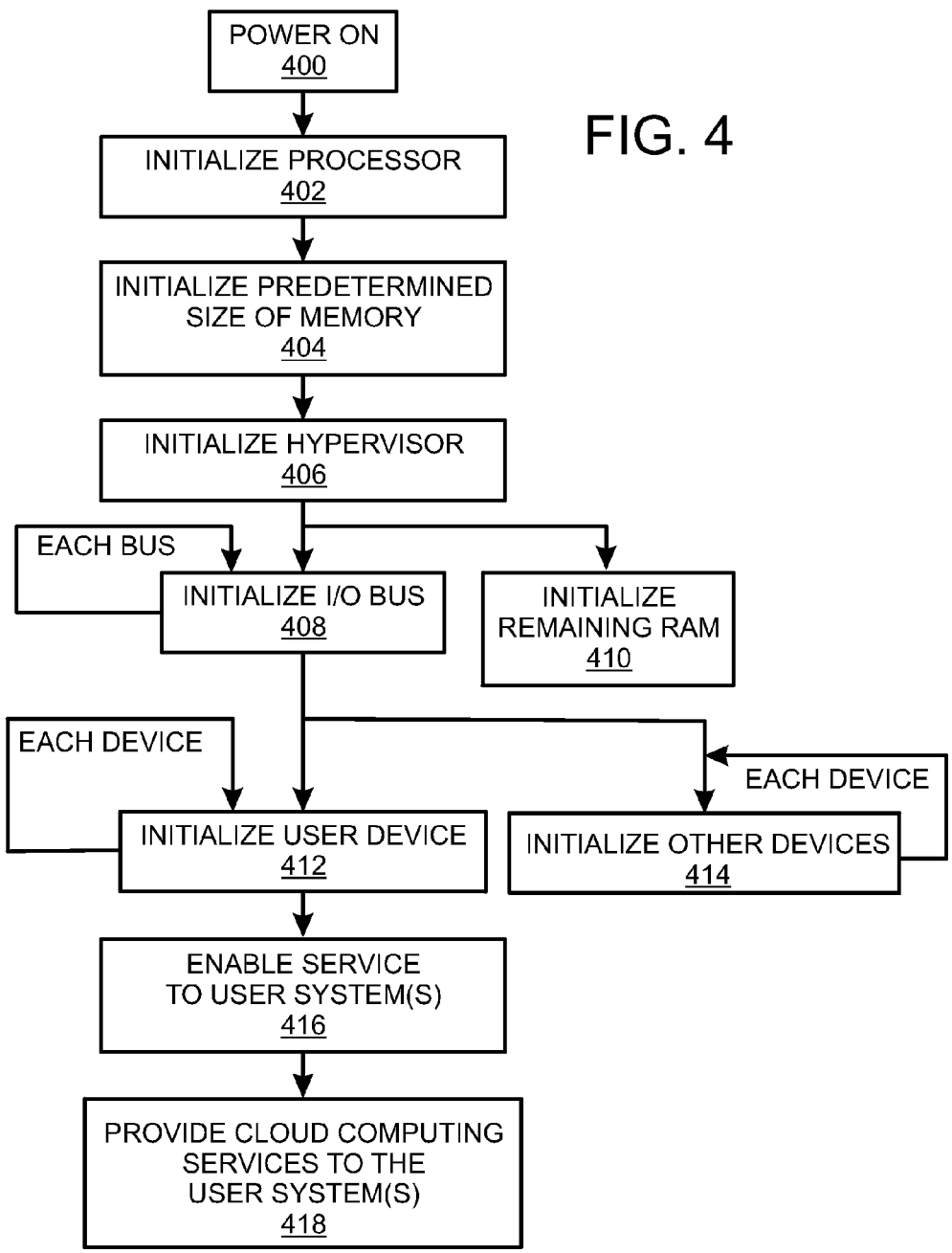
FIG. 4 sets forth a flowchart of another exemplary method of enabling a hypervisor to assume control in a cloud computing environment according to embodiments of the present invention.

FIG. 4 sets forth a flowchart illustrating another exemplary method of enabling a hypervisor to assume control in a cloud computing environment according to embodiments of the present invention. In this exemplary method, reference is made to the host system 104 shown in FIGS. 1 and 2 for purposes of illustration; however, reference to the host system 104 should not be construed as limiting. The method of FIG. 4 may include powering on or booting 400 a host system, and initializing 402 a processor. For example, the host system 104 shown in FIGS. 1 and 2 may be powered on, and the processor 116 initialized.

The method of FIG. 4 includes initializing a predetermined size of memory identified for enabling service to a user system in the cloud computing environment. For example, the platform initialization module 124 may initialize 404 a subset of RAM. The RAM may be a predefined size of memory, such as, for example, a specified portion of the memory 110 shown in FIGS. 1 and 2. The identified or specified size of RAM may be an amount sufficient for hypervisor operation. In an example, this amount of RAM may be a few megabytes in a system of a hundred gigabytes of memory.

The method of FIG. 4 includes initializing 406 a hypervisor. For example, basic kernel and memory management of the hypervisor may be initialized. Further, for example, certain drivers may be activated, such as, but not limited to, activating drivers for I/O bus chips.

The method of FIG. 4 includes initializing 408 an I/O bus identified for enabling service to a user system in the cloud computing environment. Initialization of I/O buses may continue until each identified I/O bus has been initialized.

A portion or all of the RAM or other memory that has not already been initialized may be initialized 410. Initialization of this other memory may occur subsequent to or concurrently with initializing the identified I/O bus in block 408 or with initializing one or more user devices as described herein below. In this way, computing resources identified as being needed for providing cloud computing services in accordance with embodiments of the present invention may be initialized prior to other computing resources.

The method of FIG. 4 includes initializing 412 a user device identified for enabling service to a user system in the cloud computing environment. Initialization of user devices may continue until each identified device has been initialized. Such devices may be those directly related to interacting with a user system, thus enabling user interaction. Further, such devices may depend on system configuration. Exemplary devices include, but are not limited to, a networking adapter, a display adapter, a keyboard adapter, and a mouse adapter. In addition, other devices that may be initialized include, for example, but are not limited to, a DVD drive, a fiber channel adapter, additional networking adapters, and the like.

Other user devices that have not been identified for enabling service to a user system in the cloud computing environment may be initialized 414. Initialization of these other user devices may occur subsequent to or concurrently with initializing the one or more user devices in block 412. In this way, computing resources identified as being needed for providing cloud computing services in accordance with embodiments of the present invention may be initialized prior to other computing resources.

The method of FIG. 4 includes enabling 416 services to one or more user systems. For example, after the identified resources have been initialized, the hypervisor 102 may be enabled to provide virtual machines 112 for use by the user systems 106. The host system 104 may then provide 418 cloud computing services to one or more of the user systems.

In accordance with one or more embodiments, a platform initialization module may implement a profile and discovery function. This function may enable a hypervisor to assume control for providing services in a cloud computing environment. The profile may be stored in memory of a host system and may identify or specify computing resources needed to enable access to the cloud computing environment. The computing resources may be identified in this manner such that they are given priority for initialization subsequent to host system boot or power up.

In an exemplary profile, each of the computing resources may be specified as being "CRITICAL" or "NOT CRITICAL". If a computing resource is specified as "CRITICAL," the computing resource must be available for initialization, or otherwise the platform initialization module prohibits cloud computing services from being provided to user systems. In addition, in the case that a "CRITICAL" computing resource is not available, an error condition may occur. If a computing resource is specified as "NOT CRITICAL," the computing resource does not have to be immediately available for providing cloud computing services to a host system. In the case that a "NOT CRITICAL" computing resource is not available, the initialization process of other computing resources may proceed, and computing resources may be provided to a host system even with the "NOT CRITICAL" computing resource being unavailable.

A table showing an exemplary profile follows:

TABLE 1

Exemplary Profile for Identifying Computing Resources for Enabling Access to Cloud Computing Environment

| Computing Resource | Critical? | Description |
| --- | --- | --- |
| Memory | CRITICAL | 1 GB of RAM |
| Display Adapter | NOT CRITICAL | Preferred: Built-In Video Alternate 1: Video Discovery Alternate 2: Serial Output |

As shown in Table 1, two computing resources are identified by the exemplary profile: 1 GB of RAM; and various types of display adapters. The RAM is specified as being a "CRITICAL" computing resource. The platform initialization module may use a discovery function for determining whether the specified 1 GB of RAM is available. If the specified amount of RAM is available, the RAM may be initialized in accordance with embodiments of the present invention. If the specified amount of RAM is unavailable, an error condition may occur.

Also, in the profile shown in Table 1, a display adapter is specified as being a "NOT CRITICAL" computing resource. The profile also specifies that built-in video is the preferred display adapter. The platform initialization module may scan I/O busses in the host system for the built-in video display adapter. If this display adapter is found, the platform initialization module may initialize the built-in video display adapter. If this display adapter is not found, the platform initialization module may first scan for the specified Alternate 1, and initialize this display adapter if it is found. If the Alternate 1 display adapter is not found, the platform initialization module may scan for the specified Alternate 2, and initialize this display adapter if it is found. If neither specified display adapter is found, no display adapter will be initialized, because the display adapter is specified in the profile as "NOT CRITICAL". After initialization of the computing resources specified in the profile or not initialized because they have not been found and are "NOT CRITICAL," user systems may be provided with cloud computing services in accordance with embodiments of the present invention.

Figure 5:
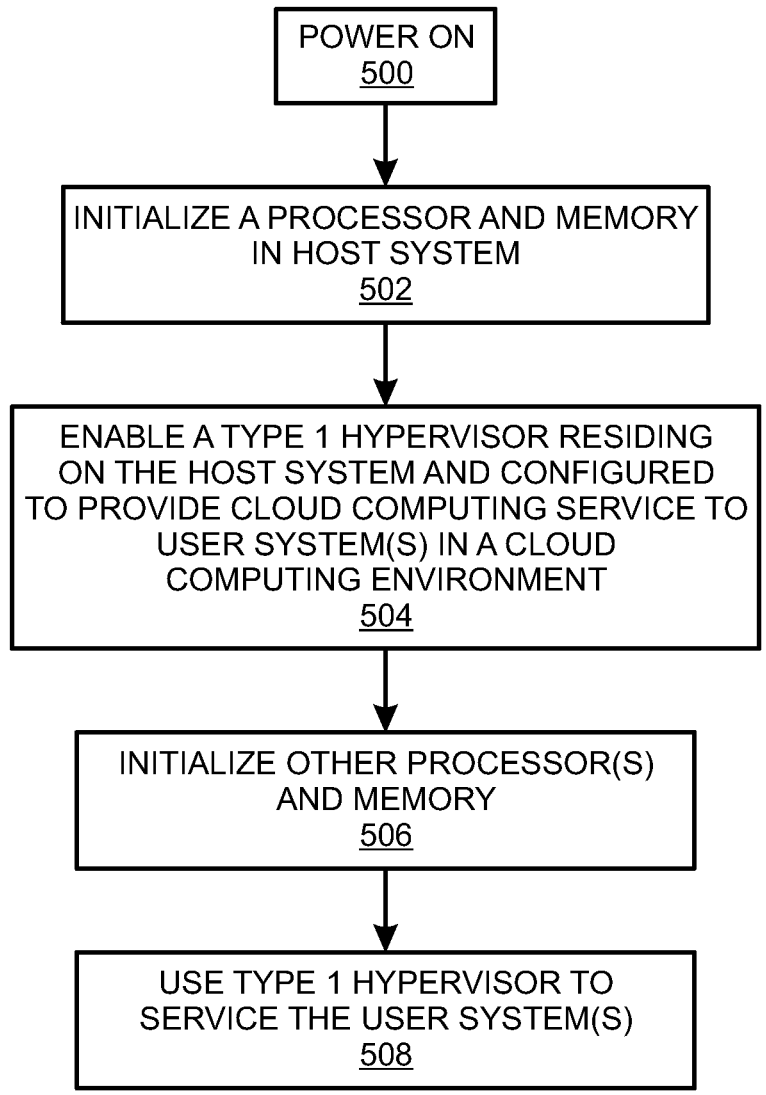
FIG. 5 sets forth a flowchart of another exemplary method for enabling a hypervisor to assume control in a cloud computing environment according to embodiments of the present invention.

FIG. 5 sets forth a flowchart illustrating another exemplary method for enabling a hypervisor to assume control in a cloud computing environment according to embodiments of the present invention. In this method, reference is made to the host system 104 shown in FIGS. 1 and 2 for purposes of illustration; however, reference to the host system 104 should not be construed as limiting. The method of FIG. 5 may include powering on or booting 500 a host system. The method of FIG. 5 may also include initializing 502 a processor and memory in the host system. For example, one or more processors and the entirety or a predetermined portion of the memory in the host system 100 may be initialized.

The method of FIG. 5 includes enabling 504 a Type 1 hypervisor residing on the host system and configured to provide cloud computing service to one or more user systems in a cloud computing environment. For example, directly after initializing the processor and memory, a Type 1 hypervisor, such as the hypervisor 102 shown in FIGS. 1 and 2, may be enabled.

The method of FIG. 5 may include initializing 506 one or more other processors and other memory portions. These other processors and memory may have not been needed for enabling the hypervisor. For this reason, they may be initialized subsequent to enabling the hypervisor such that cloud computing service may be provided to user systems quickly after boot up or power up of the host system. Further, for example, one or more I/O bus modules may be initialized subsequent to enabling the hypervisor. In another example, after initializing the hypervisor, various other system tasks may be performed by the host system, such as initializing various adapters.

The method of FIG. 5 includes using the Type 1 hypervisor to service the user systems. For example, the hypervisor 102 shown in FIGS. 1 and 2 may manage and provide guest operating systems 204 for use by the user systems 106. In another example, the hypervisor 102 may provide the virtual machines 112 for use by the user systems 106. Each virtual machine may be operable for workload execution. Further, each virtual machine may include, for example, but not limited to, a mail server, a web server, an accounting system, and the like for use by a user system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. In an example, all or a portion of the computer program product may reside on a host system, such as, but not limited to, the host system 104 shown in FIGS. 1 and 2. The computer program product may be embodied in all or a portion of the memory 110.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. For example, aspects of the present invention are described with reference to the block diagrams of FIGS. 1 and 2 and the flowcharts of FIGS. 3, 4, and 5. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A method comprising:
    specifying a first portion and a second portion of computing resources as being critical and not critical, respectively, for enabling service to a user system in a cloud computing environment;
    specifying that a first type of the second portion of computing resources is preferred over a second type of the second portion of computing resources;
    determining whether the first portion of computing resources is available for use by the user system;
    in response to determining that the first portion of computing resources is unavailable for use, implementing an error condition; and
    in response to determining that the first portion of computing resources is available for use:
        initializing the first portion of computing resources based on specification of the first portion as critical for enabling service to the user system in the cloud computing environment;
        directly after initializing the first portion of computing resources, enabling a hypervisor to the user system;
        subsequent to enabling the hypervisor to the user system, operating the user system in the cloud computing environment in a limited mode while sequentially initializing user devices for availability to the user system to enable user interaction in the cloud computing environment;
        determining whether the first type of the second portion of computing resources is available for use by the user system based on the first type of the second portion of the computing resources being preferred over the second type of the second portion of computing resources;
        in response to determining that the first type of the second portion of computing resources is available, initializing the first type of the second portion of computing resources subsequent to enabling the hypervisor based on the first type of the second portion of computing resources being available;
        determining whether the second type of the second portion of computing resources is available for use by the user system; and
        in response to determining that the second type of the second portion of computing resources is available and that the first type of the second portion is unavailable, initializing the second type of the second portion of computing resources subsequent to enabling the hypervisor.

2. The method of claim 1, wherein initializing the first portion of computing resources comprises initializing a first portion of memory identified for enabling service to the user system in the cloud computing environment, and
    wherein initializing the second portion of computing resources comprises initializing a second portion of the memory subsequent to enabling the hypervisor to the user system.

3. The method of claim 1, wherein the hypervisor provides an environment to the user system for running applications in the cloud computing environment.

4. The method of claim 3, wherein enabling the hypervisor comprises initializing at least one of a kernel, a memory management function, and a driver.

5. The method of claim 1, wherein initializing the first portion of computing resources comprises initializing a first portion of hardware resources identified for enabling service to a user system in the cloud computing environment, and
    wherein initializing the second portion of computing resources comprises initializing a second portion of the hardware resources subsequent to enabling the hypervisor to the user system.

6. The method of claim 1, wherein initializing the first portion of computing resources comprises initializing one of a processor, an input/output bus module, a display adapter, a keyboard adapter, and a mouse adapter.

7. The method of claim 1 comprising providing cloud computing services to the user system.

8. A system comprising:
    a hypervisor configured to provide cloud computing services to a user system; and
    a platform initialization module configured to:
        specify a first portion and a second portion of computing resources as being critical and not critical, respectively, for enabling service to the user system in a cloud computing environment;
        specify that a first type of the second portion of computing resources is preferred over a second type of the second portion of computing resources;
        determine whether the first portion of computing resources is available for use by the user system;
        implement an error condition in response to determining that the first portion of computing resources is unavailable for use; and
        in response to determining that the first portion of computing resources is available for use:

initialize the first portion of computing resources based on specification of the first portion as critical for enabling service to the user system in the cloud computing environment;

enable the hypervisor to the user system directly after initializing the first portion of computing resources;

operate the user system in the cloud computing environment in a limited mode while sequentially initializing user devices for availability to the user system to enable user interaction in the cloud computing environment subsequent to enabling the hypervisor to the user system;

determine whether the first type of the second portion of computing resources is available for use by the user system based on the first type of the second portion of the computing resources being preferred over the second type of the second portion of computing resources;

in response to determining that the first type of the second portion of computing resources is available, initialize the first type of the second portion of computing resources subsequent to enabling the hypervisor based on the first type of the second portion of computing resources being available;

determine whether the second type of the second portion of computing resources is available for use by the user system; and initialize the second type of the second portion of computing resources subsequent to enabling the hypervisor in response to determining that the second type of the second portion of computing resources is available and that the first type of the second portion is unavailable.

9. The system of claim 8, wherein the platform initialization module is configured to:

initialize a first portion of memory identified for enabling service to the user system in the cloud computing environment; and initialize a second portion of the memory subsequent to enabling the hypervisor to the user system.

10. The system of claim 8, wherein the platform initialization module is configured to initialize the hypervisor for providing an environment to the user system for running applications in the cloud computing environment.

11. The system of claim 8, wherein the platform initialization module is configured to initialize at least one of a kernel, a memory management function, and a driver.

12. The system of claim 8, wherein initialize the first portion of computing resources comprises initialize a first portion of hardware resources identified for enabling service to the user system in the cloud computing environment; and wherein initialize the second portion of computing resources comprises initialize a second portion of hardware resources subsequent to enabling the hypervisor to the user system.

13. The system of claim 8, wherein initialize the first portion of computing resources comprises initialize one of a processor, an input/output bus module, a display adapter, a keyboard adapter, and a mouse adapter.

14. A computer program product for enabling control in a cloud computing environment, said computer program product comprising:

a computer readable non-transitory storage medium having computer readable program code embodied therewith, the computer readable program code comprising:

computer readable program code configured to specify a first portion and a second portion of computing resources as being critical and not critical, respectively, for enabling service to a user system in the cloud computing environment;

computer readable program code configured to specify that a first type of the second portion of computing resources is preferred over a second type of the second portion of computing resources;

computer readable program code configured to determine whether the first portion of computing resources is available for use by the user system;

computer readable program code configured to implement an error condition in response to determining that the first portion of computing resources is unavailable for use;

computer readable program code configured to initialize, in response to determining that the first portion of computing resources is available for use, the first portion of computing resources based on specification of the first portion as critical for enabling service to the user system in the cloud computing environment;

computer readable program code configured to enable, in response to determining that the first portion of computing resources is available for use, a hypervisor to the user system directly after initializing the first portion of computing resources;

computer readable program code configured to operate the user system in the cloud computing environment in a limited mode while sequentially initializing user devices for availability to the user system to enable user interaction in the cloud computing environment subsequent to enabling the hypervisor to the user system;

computer readable program code configured to determine, in response to determining that the first portion of computing resources is available for use, whether the first type of the second portion of computing resources is available for use by the user system based on the first type of the second portion of the computing resources being preferred over the second type of the second portion of computing resources;

computer readable program code configured to initialize, in response to determining that the first type of the second portion of computing resources is available, the first type of the second portion of computing resources subsequent to enabling the hypervisor based on the first type of the second portion of computing resources being available;

computer readable program code configured to determine, in response to determining that the first type of the second portion of computing resources is available, whether the second type of the second portion of computing resources is available for use by the user system; and computer readable program code configured to initialize, in response to determining that the second type of the second portion of computing resources is available and that the first type of the second portion is unavailable, the second type of the second portion of computing resources subsequent to enabling the hypervisor.

15. The computer program product of claim 14, wherein initialize the first portion of computing resources comprises initialize a first portion of memory identified for enabling services to the user system in the cloud computing environment; and wherein initialize the second portion of computing resources comprises initialize a second portion of the memory subsequent to enabling the hypervisor to the user system.

16. The computer program product of claim 14, comprising computer readable program code configured to enable the hypervisor for providing an environment to the user system for running applications in the cloud computing environment.

17. The computer program product of claim 14, comprising computer readable program code configured to initialize at least one of a kernel, a memory management function, and a driver.

18. The computer program product of claim 14, wherein initialize the first portion of computing resources comprises initialize a first portion of hardware resources identified for enabling service to the user system in the cloud computing environment; and wherein initialize the second portion of computing resources comprises initialize a second portion of hardware resources subsequent to enabling the hypervisor to the user system.

19. The computer program product of claim 14, wherein initialize the first portion of computing resources comprises initialize one of a processor, an input/output bus module, a display adapter, a keyboard adapter, and a mouse adapter.

20. The computer program product of claim 14, comprising computer readable program code configured to provide cloud computing services to the user system.

\* \* \* \* \*